Patented Oct. 13, 1942

2,298,401

UNITED STATES PATENT OFFICE 2,298,401

TREATMENT OF TEXTILE MATERIAL

James G. McNally and Edgar C. Jensen, Rochester, N. Y., assignors to Eastman Kodak Company, Rochester, N. Y., a corporation of New Jersey No Drawing. Application August 22, 1940, Serial No. 353,670

4 Claims. (Cl. 8—61)

This invention relates to the treatment of organic derivative of cellulose textile materials to improve the fastness of their colorations. The invention is especially adapted to the treatment of colored cellulose acetate textile materials.

A large number of dyes are known which color organic derivatives of cellulose but considerable difficulty has been experienced in securing dyeings resistant to what is known in the textile trade as "atmospheric," "gas" or "acid" fading of dyed textiles. The discoloration caused by such fading has been found, in large part, to be the result of chemical action on certain dyes of gaseous combustion products commonly present in the atmosphere. For simplicity, the fading which we have mentioned above will be referred to hereinafter as atmospheric fading.

Fumes from gas burners are believed to constitute the chief source of gases causing atmospheric fading. However, it will be clearly understood that fumes from gas burners by no means constitute the only fumes causing such fading as combustion gases from the burning of combustible products such as coal, oil, illuminating gas, natural gas, gasoline and coal gas and nitrous acid fumes all cause atmospheric fading. Gases such as those above mentioned are ordinarily present in the atmosphere, particularly in the atmosphere of industrial towns or cities. These gases, therefore, are those to which colored cellulose acetate fabrics, for example, are commonly constantly exposed and, accordingly, for a practical solution of the problem of atmospheric fading the colorations should be fast to such gases. The present invention is directed primarily to providing a process for treating organic derivative of cellulose textile materials to render their colorations more fast to atmospheric fading. Treatment in accordance with the present invention may sometimes improve the fastness of the coloration to light.

Generally speaking, colored organic derivatives of cellulose, especially cellulose acetate, have been found to be more susceptible to atmospheric fading than other colored fabrics. Further, such fading of cellulose acetate fabrics has been found to be substantially confined to materials colored blue or to materials colored with a mixture of dyes containing a blue dye as one component. It is, accordingly, an object of our invention to provide a process for the treatment of organic derivative of cellulose textile materials whose colorations are subject to atmospheric fading whereby said colorations are rendered more resistant to atmospheric fading.

A further object of our invention is to provide colored organic derivative of cellulose textile materials which are highly resistant to atmospheric fading. Another object is to provide a process for the treatment of blue colored organic derivative of cellulose, especially cellulose acetate, textile materials, whose colorations are subect to atmospheric fading, whereby said colorations are rendered more resistant to atmospheric fading.

The expression "an organic derivative of cellulose", as used herein, and in the claims, includes the hyrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose.

While the process of our invention is of general utility for increasing the resistance to atmospheric fading of organic derivative of cellulose textile materials whose colorations are subject to atmospheric fading, it is of particular utility for increasing the resistance to atmospheric fading of such materials colored with certain anthraquinone dyes, particularly those containing free amino or alkylamino groups. These aminoanthraquinone dyes which are further characterized in that they contain no nuclear free sulfonic or carboxylic acid group suffer from a lack of fastness to atmospheric fading or to the combined agencies of atmospheric fading and light but are otherwise of great value for the coloration of organic derivatives of cellulose.

Some of the aminoanthraquinone dyes above referred to color cellulose esters or ethers valuable blue shades difficult to secure by other means and it is, accordingly, of considerable importance that a satisfactory method of increasing the fastness of these dyes to atmospheric fading be found. Since the process of our invention appears to be of greatest importance in connection with colorations yielded by aminoanthraquinone dyes on organic derivatives of cellulose, it will be illustrated more particularly in connection with colorations yielded by such dyes. The applicability of the process of our invention in any given situation can readily be determined by the simple test described hereinafter.

In order that the color changes which take place in cellulose acetate fabrics, for example, dyed with various dyes containing an amino or substituted amino group may be fully understood, it might be noted that cellulose acetate colored blue with 1,4 - dimethylaminoanthraquinone, when exposed to the combustion products of coal gas or nitrous acid fumes, changes in a short time to a pinkish red. Similar color changes occur in cellulose acetate fabrics dyed with other aminoanthraquinone dyes such as 1,4-di-β-hydroxyethylaminoanthraquinone, 1 - amino - 4-β- hydroxyethylaminoanthraquinone, 1-methylamino - 4 - β - hydroxyethylaminoanthraquinone, 1-methylamino-4-β'- hydroxy-β-ethoxyethylaminoanthraquinone, 1,4 - di - (mono - β' - ethoxy - β-ethoxy) - ethylaminoanthraquinone, 1,4 - di- (mono-β''-hydroxy-β'-ethoxy-β-ethoxy) - ethylaminoanthraquinone, 1 - methylamino-4-β-ethoxy-ethylaminoanthraquinone, 1-β-hydroxyethylamino-4-β'-hydroxy - β - ethoxyethylaminoanthraquinone, 1-β'-hydroxy-β-ethoxyethylamino-4-β''-hydroxy-β'-ethoxy-β-ethoxyethylamino-anthraquinone, 1-methyl-amino-4-β''-hydroxy-β'-ethoxy-β-ethoxyethylaminoanthraquinone, 1-β'-methoxy-β-ethoxyethylamino - 4-β'-hydroxy - β - ethoxyethylaminoanthraquinone, 1-hydroxy-4-methylaminoanthraquinone, 1 - amino-4-β-hydroxypropylaminoanthraquinone and 1,4-diaminoanthraquinone, for example. Again, in the case of 1-methylamino-4-p-aminophenyl-aminoanthraquinone, the color changes from blue-green to gray.

Various processes have been suggested for treating organic derivative of cellulose textile materials with chemical inhibiting agents to render colorations thereon more resistant to atmospheric fading but so far as we are aware, with the exception of the process described in McNally and Dickey U. S. Patent No. 2,176,506, these processes have not proved commercially operative. With the exception noted, the agents hitherto suggested have been commercially inoperative due, among other reasons, either to their toxicity, their causing skin irritation, their promotion of discoloration of the fabric on exposure to sunlight, their objectionable odor, their removal by dry cleaning solvents, their high cost or their general inoperativeness for the purpose suggested.

We have discovered that if a hydroxyalkyl diamine, having the general formula:

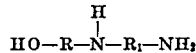

wherein R and R₁ each represents a member selected from the group consisting of ethylene and propylene, is incorporated into organic derivative of cellulose textile materials, the colorations of dyes having affinity for such materials, but which are not fast to atmospheric fading, are rendered substantially more resistant to atmospheric fading. By means of our invention, therefore, fading of colorations in organic derivative of cellulose textile materials due to atmospheric fading can be greatly mitigated or substantially obviated and in some instances improvement in the fastness of the coloration to light appears to be obtained.

From a consideration of the above general formula, it can be seen that the hydroxyalkyl diamine compounds employed by us are selected from the group consisting of N-β-hydroxyethyl ethylenediamine, N-β-hydroxyethyl propylenediamine, N-β-hydroxypropyl propylenediamine and N-β-hydroxypropyl ethylenediamine. The use of N-β-hydroxyethyl ethylenediamine appears to be advantageous.

It has been proposed to determine the fastness of colorations on organic derivative of cellulose textile material by exposing the colored material to nitrous acid fumes. This test, however, while of value, has not been found to be entirely satisfactory since experience has shown that it does not always accurately determine or measure the fastness of a coloration to the conditions or agencies to which the coloration will normally be exposed. That is to say, a coloration may be sufficiently fast to nitrous acid fumes to be regarded as commercially practical yet not be sufficiently fast to the combustion gases present in the atmosphere to be commercially practical. In other instances the reverse situation may hold and the coloration may be fast to said combustion gases but not fast to nitrous acid fumes. The incorporation of an inhibiting agent of our invention into cellulose ester or ether materials does increase the fastness of colorations produced therein with respect to nitrous acid fumes but for the reasons above given the proposed nitrous acid tests are not to be taken as an infallible criterion as to whether colorations are or are not fast to atmospheric fading. In practice, it has been found that exposure of the coloration to the combustion gases resulting from the burning of illuminating gas in a Bunsen burner provides a simple and more reliable test of the fastness of the coloration to atmospheric fading than the proposed nitrous acid test.

The hydroxyalkyl diamine inhibiting agents of our invention can be incorporated in the material undergoing treatment before, during, or after dyeing. Advantageously, however, the hydroxyalkyl diamine inhibiting agent is added to the material after dyeing as best results appear to be obtained when this procedure is followed. The hydroxyalkyl diamine inhibiting compound may be incorporated into the material prior to dyeing by immersing the undyed material into an aqueous solution of the inhibitor and permitting the material to remain immersed until it has absorbed a suitable amount of the inhibitor. Another method is to incorporate the inhibitor into the spinning solution used in the manufacture of the organic derivative of cellulose material. Thus, for example, the hydroxyalkyl diamine compound may be incorporated in a cellulose acetate spinning solution and this solution may be spun according to dry spinning methods to produce cellulose acetate filaments which are capable of being directly dyed in shades fast to atmospheric fading. Again, the inhibiting agent may be added to the dyebath and become impregnated in the material during the dyeing operation. These methods wherein the inhibitor is applied to the material before or during dyeing have not been found to yield as satisfactory results as where the inhibitor is applied to the material to the treated after dyeing.

The hydroxyalkyl diamine inhibiting agents of our invention are colorless, odorless liquids. A procedure which has been found advantageous for the application of these inhibitors is to impregnate the colored organic derivative of cellulose material after drying on the tenter frame with an aqueous solution containing from 1½ to 2% of the inhibitor. This separation is conveniently carried out by passing the material through a mangle or quetsch which is arranged to allow the goods to pick up, for example, from 75% to 100% of solution based on the dry weight of the fabric. The fabric after impregnation is then dried on the tenter frame or by other means without extraction so that it contains approximately 0.75 to 1.1% of inhibitor by weight. The inhibitor may be applied to the material by means of a jig or a dye box but it has been our experience that the quetsch or mangle is the most effective and economical way of applying it.

The amount of the inhibitor incorporated in the material to be treated is, of course, subject to variation. The proportions above mentioned have been found by experience to be very satisfactory but it will be understood that the benefits of the invention can be obtained in varying degree by the use of greater or lesser proportions of the inhibitor. Generally speaking, if less than about 0.40% (by weight on the dry material) of the inhibitor is impregnated in the material, the protection obtained is inadequate. For effective protection, the material should normally contain at least 1% of the inhibitor by weight. Ordinarily, the incorporation of much more than 1% of the inhibitor is unnecessary and 2–3% can be taken as the upper limit of the amount which one seldom, if ever, need exceed. From the foregoing it is apparent that if too small amounts of the inhibitor are incorporated in the material undergoing treatment the maximum benefits of the invention will not be obtained. On the other hand it is apparent that large amounts of the inhibitor need not be employed to obtain maximum benefits.

The amount of the hydroxyalkyl diamine compound that needs to be incorporated in the material undergoing treatment is dependent somewhat upon the particular material being treated and the extent of the improvement in the fastness of the coloration desired. Further, the amount of the inhibitor to be incorporated in the material is dependent somewhat upon the dye or dyes employed for the coloration of the material. The colorations of certain dyes, as will be appreciated, are more subject to atmospheric fading than others and consequently in those cases a more intensive treatment in accordance with our invention is required to produce colorations of good resistance to atmospheric fading. The amount of the treating agent necessary to be incorporated in the material in any given instance, however, can readily be determined by test.

The following examples illustrate the invention without, however, being in any way limitative.

Example 1

1 gram of N-β-hydroxyethyl ethylenediamine is dissolved in 100 cc. of water containing a small amount of sulfonated castor oil and 50 grams of cellulose acetate fabric dyed blue with 1,4-dimethylaminoanthraquinone is immersed in the treating solution and worked. When the fabric is completely wet out, it is removed and dried in the usual manner. By the treatment just described, the fastness of the coloration to atmospheric fading is substantially improved.

1 gram of N-β-hydroxyethyl propylenediamine or N-β-hydroxypropyl ethylenediamine, for example, can be substituted for the N-β-hydroxyethyl ethylenediamine of the example to obtain substantially the same results.

Example 2

An acetate satin lining cloth dyed blue with an aqueous dispersion of 1-methylamino-4-ethylaminoanthraquinone, for example, is dried, tentered and treated on a mangle with an aqueous solution containing 1.5% by weight of N-β-hydroxypropyl propylenediamine at 40° C. The roll pressure on the machine is regulated so that the fabric picks up at least 40% of its weight of the solution, following which the fabric is dried in known fashion. The operation just described may be applied to other acetate fabrics such as taffeta and crepe.

Example 3

A cellulose acetate fabric dyed blue with a mixture of dyes, such as 2,4-dinitro-6-sulfonethylamide benzeneazo - N-β,γ-dihydroxypropyl- 7-ethyl-tetrahydroquinoline and 1-methylamino- 4 - β - ethoxyethylamino - anthraquinone or 1-methylamino-4-β′-hydroxy-β-ethoxyethylamino-anthraquinone and 1-β-hydroxyethylamino-4-propylamino-anthraquinone, for example, is treated on a mangle with a 2.0% aqueous solution of N-β-hydroxyethyl ethylene diamine at 40° C. The roll pressure on the machine is regulated so that the fabric picks up 50% of its weight of the solution, following which the fabric is dried in the usual manner. The fastness of the coloration to atmospheric fading is substantially improved.

A 2% aqueous solution containing equivalent molecular weights of N-β-hydroxyethyl-ethylenediamine and N-β-hydroxyethyl propylenediamine, for example, can be used in place of the N-β-hydroxyethyl ethylenediamine solution of the example. Similarly a mixed cellulose acetate and viscose fabric, a cellulose propionate fabric or a silk and cellulose acetate fabric, and in which the cellulose ester material is dyed with a dye which yields colorations subject to atmospheric fading, can be treated instead of the cellulose acetate fabric of the example.

The material undergoing treatment may consist of a single organic derivative of cellulose or it may be made from a mixture of two or more organic derivatives of cellulose. Again, mixed cellulose esters as cellulose acetate-propionate, for example, can be treated. Similarly, the material undergoing treatment may consist of an organic derivative of cellulose material in admixture with one or more other materials such as wool, silk, cotton or viscose, for example. Mixtures containing an organic derivative of cellulose material and another material should not be treated without first determining whether the color of the other material is adversely affected by any treatment to which the material may be subsequently exposed. This precaution is set forth since we have noted that the shade of some dyeings on viscose have been adversely affected particularly with reference to behavior during hot pressing.

The inhibiting agents of our invention can be applied by themselves to fabrics requiring no other finishing treatment to produce the desired properties in the finished fabric. The inhibitors of our invention can likewise be employed in conjunction with any other inhibitor with which they are compatible such as the melamine inhibitors described in McNally and Dickey U. S. Patent No. 2,176,506. Both the hydroxylalkyl diamine inhibitors of the present invention and the melamine compounds just referred to are comparatively ineffective when applied in conjunction with an acidic finishing compound and, for satisfactory results, care should be taken that the finishing solution applied should be either neutral or slightly alkaline in reaction. The inclusion of borax in the finishing solution has been found to be advantageous but other alkaline agents such as sodium carbonate can be employed. In some instances it has also been found useful to include a small proportion of denatured alcohol in the finishing solution. If the inhibitors of the present invention are used in conjunction with the melamine inhibitors described in U. S. Patent No. 2,176,506, the precautions set forth in the patent for applying the melamine inhibitors must be observed if satisfactory results are to be obtained.

Following is an example of a composition containing a melamine inhibitor and an inhibitor of the present invention which can be employed. Parts are expressed by weight.

| | Parts |
|---|---|
| Melamine | 1.5 |
| N-β-hydroxyethyl ethylenediamine | 1 |
| Borax | .25 to .50 |
| Denatured alcohol | 1 |
| Water | 100 |

A solution of the above proportions can be placed in the mangle and the dry goods passed through the solution such that 75 to 100% of the solution by weight is picked up by the goods. Throughout the treatment the temperature of the solution should be maintained at no less than about 140° F. not only in the pan or box of the mangle but also at all points between the make-up tank and the mangle pan. If such a temperature is not maintained, the solution may cool sufficiently that some of the melamine inhibitor may separate out. This separation of the melamine from the solution causes not only a loss of effectiveness but may also cause the melamine to be deposited on the goods as spots or specks.

While our invention has been illustrated more particularly in connection with the treatment of cellulose acetate materials, it will be understood that other cellulose ester or ether materials may likewise be treated in accordance with the invention to improve the fastness of their colorations to atmospheric fading.

The inhibiting agents employed in the practice of our invention may be applied to the material undergoing treatment in any suitable manner. Where a textile material in the form of cloth or fabric, for example, is undergoing treatment, the inhibitors may be applied thereto from an aqueous solution with or without the aid of solubilizing or dispersing agents. Thus the inhibitor can be added to a bath containing a solubilizing or dispersing agent such as sulfonated castor oil or sulfonated olive oil and applied to the material to be treated with the aid thereof. Ordinarily, the use of a solubilizing or dispersing agent is unnecessary since the inhibiting agents of our invention can be applied to the material from their water solutions.

The present invention is free from the objections noted in connection with substantially all prior processes which have been suggested for treating materials to make colors thereon more resistant to atmospheric fading. Since the inhibitors of the present invention are non-toxic, odorless, highly insoluble in dry cleaning solvents and cause no skin irritation materials treated with them likewise are non-toxic, cause no skin irritation and have no objectionable odor resulting from the presence of the inhibitor therein. Further, materials such as dyed cellulose acetate fabrics treated with the inhibitors of our invention can be subjected to dry cleaning without removal of the inhibitors because of their insolubility in dry cleaning solvents. Again, the inhibitors of the present invention do not promote discoloration of the fabric, for example, on exposure to sunlight. Further, the inhibitors employed are highly effective for the purpose of rendering colorations on organic derivative of cellulose textile materials resistant to atmospheric fading and possess the further advantage that they may be simply and economically applied to these materials.

It will be understood, of course, that since the inhibitors are the chemical agents protecting the coloration of the material from atmospheric fading, they must remain in the material after once being incorporated or impregnated therein. The relative insolubility of our inhibitors in cleaning solvents is of great value since, because of this feature, they will remain in the material even though it be subjected to dry cleaning.

While the improvement in the fastness of the coloration by treatment in accordance with our invention is subject to variation depending, for example, upon the material being treated and the dye employed for the coloration and, therefore, a statement with respect to improvement in the fastness of the coloration to atmospheric fading applicable to all situations cannot be made, we have noted that in the case of anthraquinone dyes applied for the coloration of cellulose acetate materials, the color of the untreated material is appreciably changed in 12 to 24 hours whereas these materials so colored when treated with the inhibitors described herein do not fade or undergo any appreciable color change in 100 hours. The times above stated refer in each instance to exposure of the material to the combustion gases from a Bunsen gas burner burning illuminating gas (i. e., the materials are subjected to the test more fully described hereinbefore). In many instances the colorations of the treated materials remain substantially unchanged for periods greatly exceeding 100 hours. It should be further noted that deep shades of colors are ordinarily more resistant to atmospheric fading than light shades and, accordingly, a less extensive treatment in accordance with our invention is required in the case of the deeper shades than in the case of the light shades.

As all of the inhibitors employed by us do not appear to be described in the prior art, their preparation is indicated hereinafter. N-β-hydroxyethylethylenediamine and N-β-hydroxypropylethylenediamine can be prepared by reacting ethylenediamine and propylenediamine, respectively, with ethylene oxide or ethylene chlorohydrin. N-β-hydroxypropylethylenediamine and N-β-hydroxypropylpropylenediamine can be prepared by reacting ethylenediamine and propylenediamine, respectively, with propylene oxide or propylene chlorohydrin. Since the method of reacting with ethylene oxide, propylene oxide, ethylene chlorohydrin and propylene chlorohydrin is well known to those skilled in the art, the above information is believed sufficient to teach one skilled in the art how our inhibitors can be prepared.

We claim:
1. Textile material comprising an organic derivative of cellulose colored with an aminoanthraquinone dye and containing a compound having the general formula:

$$HO-R-\underset{|}{\overset{H}{N}}-R_1-NH_2$$

wherein R and $R_1$ each represents a member selected from the group consisting of ethylene and propylene.

2. Textile material comprising an organic derivative of cellulose colored with an aminoanthraquinone dye and containing N-β-hydroxyethyl ethylenediamine.

3. Textile material comprising a cellulose acetate colored with an aminoanthraquinone dye and containing a compound having the general formula:

$$HO-R-\underset{|}{\overset{H}{N}}-R_1-NH_2$$

wherein R and $R_1$ each represents a member selected from the group consisting of ethylene and propylene.

4. Textile material comprising a cellulose acetate colored with an aminoanthraquinone dye and containing N-β-hydroxyethyl ethylenediamine.

JAMES G. McNALLY.
EDGAR C. JENSEN.